United States Patent
Saunders

(10) Patent No.: US 10,246,183 B1
(45) Date of Patent: Apr. 2, 2019

(54) PROPELLER IMPACT DETECTION AND FORCE REDUCTION

(71) Applicant: Kitty Hawk Corporation, Mountain View, CA (US)

(72) Inventor: Christopher Scott Saunders, San Jose, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/877,047

(22) Filed: Jan. 22, 2018

Related U.S. Application Data

(60) Provisional application No. 62/595,963, filed on Dec. 7, 2017.

(51) Int. Cl.
| | |
|---|---|
| *B64C 27/00* | (2006.01) |
| *B64C 27/08* | (2006.01) |
| *B64D 31/10* | (2006.01) |
| *B64D 45/00* | (2006.01) |
| *B64D 17/80* | (2006.01) |

(52) U.S. Cl.
CPC ............ *B64C 27/006* (2013.01); *B64C 27/08* (2013.01); *B64D 17/80* (2013.01); *B64D 31/10* (2013.01); *B64D 45/00* (2013.01); *B64D 2045/0085* (2013.01)

(58) Field of Classification Search
CPC ....... B64C 27/006; B64C 27/08; B64D 17/80; B64D 31/10; B64D 45/00
USPC .......................................................... 701/14
See application file for complete search history.

(56) References Cited

U.S. PATENT DOCUMENTS

| | | |
|---|---|---|
| 9,828,095 B1 | 11/2017 | Wilcox |
| 2002/0117579 A1 | 8/2002 | Kotoulas |
| 2013/0197747 A1 | 8/2013 | Tourin |
| 2013/0265185 A1* | 10/2013 | Kreitmair-Steck .......... G01S 13/9303 342/29 |
| 2016/0059958 A1* | 3/2016 | Kvitnevskiy ........... B64C 27/52 701/3 |
| 2016/0304190 A1* | 10/2016 | Grohmann ............. B64C 13/46 |
| 2016/0375982 A1 | 12/2016 | Rifenburgh |
| 2017/0267367 A1 | 9/2017 | Senkel |
| 2017/0274983 A1 | 9/2017 | Beckman |
| 2017/0369166 A1* | 12/2017 | van den Heuvel ... B64C 39/022 |

OTHER PUBLICATIONS

Texas Instruments, InstaSPIN-FOC and InstaSPIN-MOTION User's Guide, Jan. 2013—Revised Feb. 2017.

* cited by examiner

*Primary Examiner* — Muhammad Shafi
(74) *Attorney, Agent, or Firm* — Van Pelt, Yi & James LLP

(57) ABSTRACT

A commanded control signal is compared against an adaptive control signal in order to detect a rotor strike by a rotor included in an aircraft, wherein the adaptive control signal is associated with controlling the rotor and the adaptive control signal varies based at least in part on the commanded control signal and state information associated with the rotor. In response to detecting the rotor strike, a control signal to the rotor is adjusted in order to reduce a striking force associated with the rotor.

21 Claims, 14 Drawing Sheets

PROPELLER IMPACT DETECTION AND FORCE REDUCTION

CROSS REFERENCE TO OTHER APPLICATIONS

This application claims priority to U.S. Provisional Patent Application No. 62/595,963 entitled PROPELLER IMPACT DETECTION AND FORCE REDUCTION filed Dec. 7, 2017 which is incorporated herein by reference for all purposes.

BACKGROUND OF THE INVENTION

New types of lightweight and ultra-lightweight aircraft are being developed for recreational use, use by novice pilots, and/or for use in new flying environments (e.g., they can take off and land from a backyard). In some of these aircraft, the rotors have no shield or blade and are therefore exposed. New techniques to detect a rotor strike and reduce the rotor's force in response to detection of a rotor strike would be desirable. Although strike detection techniques may exist for other applications, it would be desirable if techniques were lightweight, low cost, and/or better suited to the various needs and/or design considerations of an aircraft.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to detect a rotor strike and respond accordingly are described herein. In some embodiments, the process is performed by an aircraft, such as a multicopter. In some embodiments, the technique includes comparing a commanded control signal against an adaptive control signal in order to detect a rotor strike by a rotor included in an aircraft, where the adaptive control signal is associated with controlling the rotor and the adaptive control signal varies based at least in part on the commanded control signal and state information associated with the rotor; in response to detecting the rotor strike, a control signal to the rotor is adjusted in order to reduce a striking force associated with the rotor.

Figure 1:
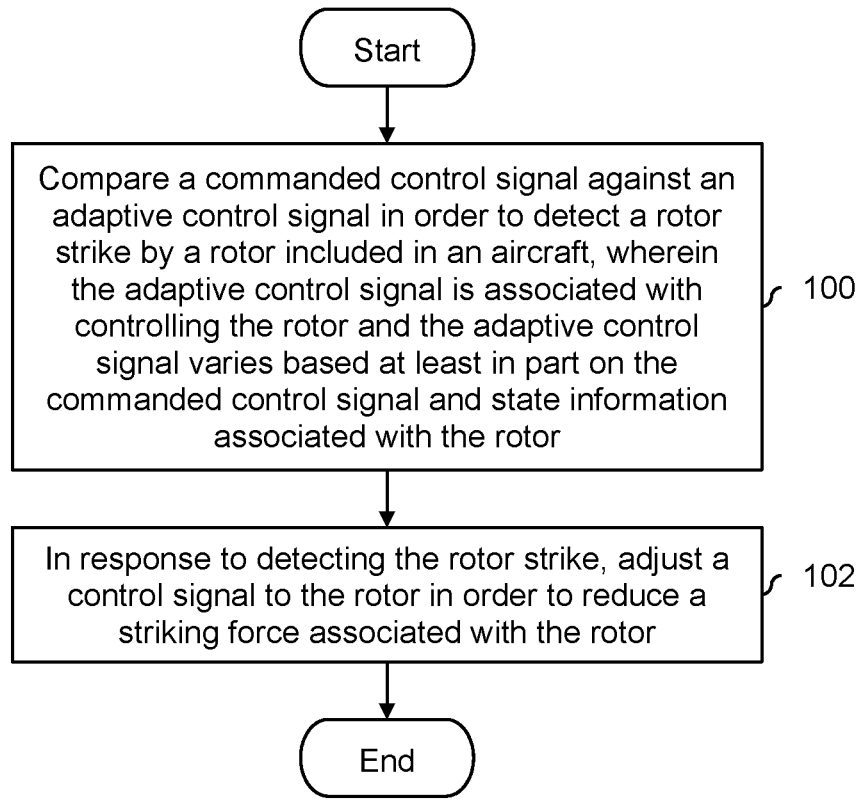
FIG. 1 is a flowchart illustrating an embodiment of a process to detect a rotor strike and perform an adjustment to reduce a striking force in response to a detected rotor strike.

FIG. 1 is a flowchart illustrating an embodiment of a process to detect a rotor strike and perform an adjustment to reduce a striking force in response to a detected rotor strike. In some embodiments, the process is performed by an aircraft (e.g., a multicopter) where the rotors have no shield or guard to prevent the rotors from striking anything. In some applications, such aircraft are not taking off and landing at airports and therefore space around the aircraft may be less controlled compared to airports during takeoff and landing. In one example, the aircraft is a single-seat, recreational multicopter and the owner takes off and lands from his/her backyard (e.g., where the multicopter may strike a person, a pet, a tree, etc.).

At 100, a commanded control signal is compared against an adaptive control signal in order to detect a rotor strike by a rotor included in an aircraft, wherein the adaptive control signal is associated with controlling the rotor and the adaptive control signal varies based at least in part on the commanded control signal and state information associated with the rotor. In one example where the aircraft is a manned aircraft, the commanded control signal is based on a pilot's instructions or commands (e.g., which are received via one or more hand controls, such as a joystick, a thumbwheel, etc.) and/or a flight controller (e.g., the pilot is not touching the joystick and the flight computer performs small adjustments to keep the multicopter hover in air in the same position). In some embodiments, the aircraft has an automated flight controller (e.g., in an unmanned aircraft with autonomous flight capabilities) and the commanded control signal comes from the automated flight controller. In some examples described below, the commanded control signal conveys or otherwise indicates a desired rotations per minute (RPMs) or a desired torque (e.g., associated with a particular rotor in the case of a multicopter).

Generally speaking, a rotor strike is detected or declared at step 100 when the adaptive control signal and the commanded control signal do not indicate the same or similar thing (e.g., similar RPMs or similar torques). For example, suppose that the pilot is not holding the joystick and so the flight controller only makes small changes to the commanded control signal so that the aircraft hovers in air at constant position. If, during this period, a very large spike or increase (e.g., in torque) is observed in the adaptive control signal, this would be flagged as a rotor strike (at least in this example) because there was no corresponding indicator in the commanded control signal that an increase (e.g., in torque) was requested by the pilot and/or the flight controller. Presumably, the rotor has hit something and this resistance was observed by the control system and/or feedback loop, causing the adaptive control signal to increase.

In contrast, if the pilot (who previously had not been holding the joystick) grabbed the joystick in order start moving (e.g., quickly), this increase or change would be reflected in the adaptive control signal, and a spike or increase by the adaptive control signal would not be flagged or otherwise identified as a rotor strike because there would be a corresponding increase or indication in the commanded control signal. More detailed examples of how rotor strike detection is performed are described below.

At 102, in response to detecting the rotor strike, a control signal to the rotor is adjusted in order to reduce a striking force associated with the rotor. In some embodiments, the control signal which is adjusted is the adaptive control signal. Alternatively, in some other embodiments, the commanded control signal may be the control signal which is adjusted at step 102.

In some embodiments, the adjustment to the control signal at step 102 actively stops the rotation of the rotor (e.g., by applying a braking instruction or braking force). For example, the adjustment to the control signal may cause the control signal to indicate that the rotor should rotate in the opposite direction (e.g., acting like a braking force on the rotor). Alternatively, the control signal to the rotor can be changed to a neutral value, where the rotor is instructed to rotate in neither direction. In that scenario, inertia will cause the rotor to continue rotating in its current direction but the striking force will be reduced because the control signal is no longer instructing the rotor to continue rotating.

The following figures describe an exemplary aircraft which may use the process of FIG. 1 to detect rotor strikes and reduce a striking force generated by a corresponding rotor accordingly.

Figure 2A:
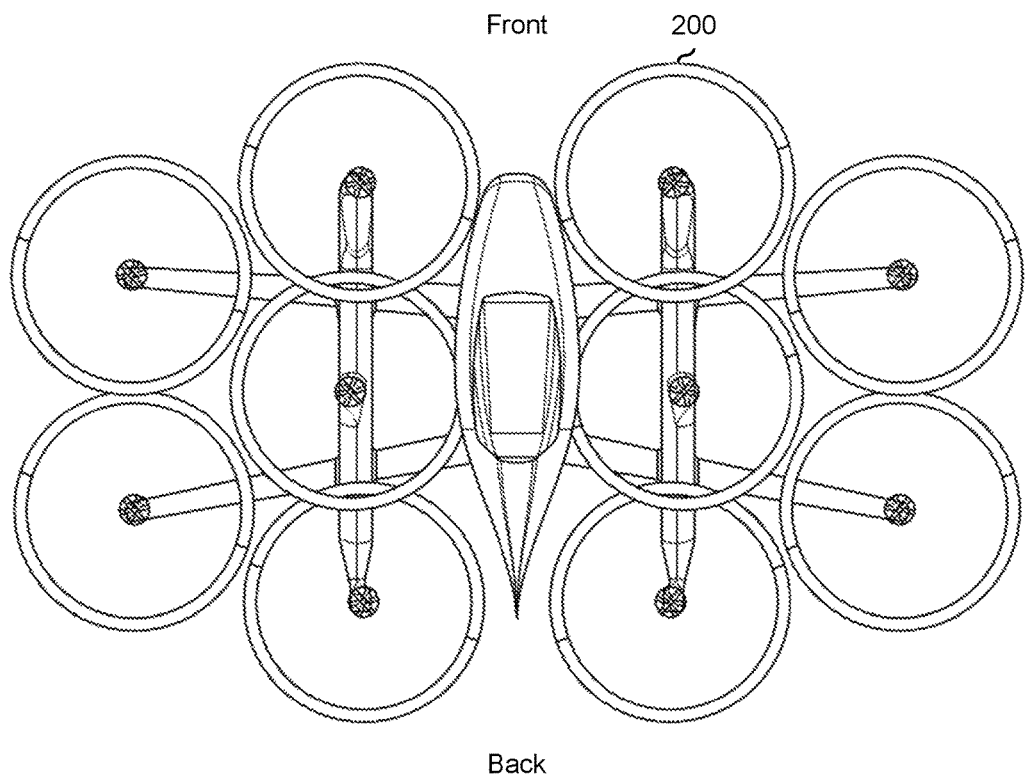
FIG. 2A is a diagram illustrating a top view of a multicopter embodiment with unshielded rotors.

FIG. 2A is a diagram illustrating a top view of a multicopter embodiment with unshielded rotors. In the example shown, multicopter 200 is a single seat aircraft with 10 rotors where the rotors have no guard or shield (e.g., for cost and/or weight reasons) to prevent the rotors from coming into contact with something, either while the multicopter is on the ground or in the air. In multicopter 200, the rotors are mounted to the multicopter at fixed positions or angles. To maneuver, the various rotors are rotated independently of one another at different speeds. Although not necessarily shown from this top view, the rotors are all slightly angled (i.e., they do not rotate in a level horizontal plane) to make the multicopter more maneuverable.

In this example, multicopter 200 takes off and lands vertically. This feature eliminates the need for a runway (e.g., the multicopter can take off and land in a field, in a backyard, etc.). After ascending vertically during takeoff, the aircraft can switch to a forward flight mode of flight (e.g., once a desired cruising altitude is reached) where the aircraft flies at a constant or steady altitude. If desired, the multicopter can hover at a constant or steady position midair.

For redundancy and to avoid a single point of failure (which is desirable in aircraft design), each of the 10 rotors in this example has its own set of hardware and/or electrical components which monitor the corresponding rotor for a rotor strike. In this example, each set of electronics independently performs the process of FIG. 1 on its respective rotor. That way, even if one set of electronics (e.g., associated with one rotor) fails, a rotor strike can still be detected for another rotor and the striking force for that rotor can be reduced.

Figure 2B:
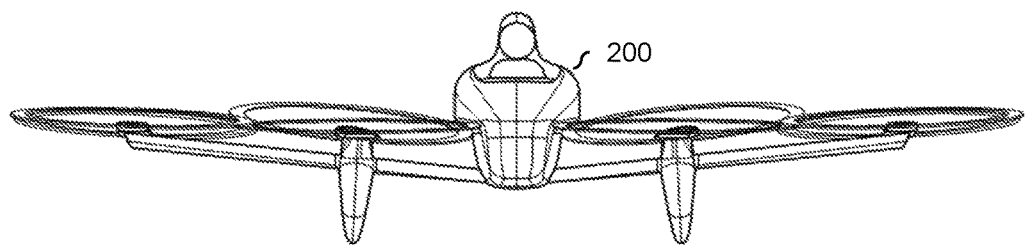
FIG. 2B is a diagram illustrating a front view of a multicopter embodiment with unshielded rotors.

FIG. 2B is a diagram illustrating a front view of a multicopter embodiment with unshielded rotors. FIG. 2B shows the same exemplary multicopter 200 from FIG. 2A but from a different view. From this front view, the height of the rotors relative to the ground is more readily apparent and in this example the rotors are on the order of 2-4 feet off the ground. At this rotor height (e.g., which is less than the average height of an adult), a rotor strike is possible when the multicopter is on the ground and the rotors are rotating. In some cases, a rotor strike occurs when the multicopter is airborne but is relatively low to the ground. A rotor strike can also occur at higher altitudes. For example, the aircraft could be 20 feet off the ground or higher and one or more of the rotors could strike a tree, a power or telephone line, a bird, etc.

In the exemplary multicopter shown here, the adaptive control signal (not shown) includes a plurality of phase-shifted sinusoidal signals. The following figures describe an example of this.

Figure 3A:
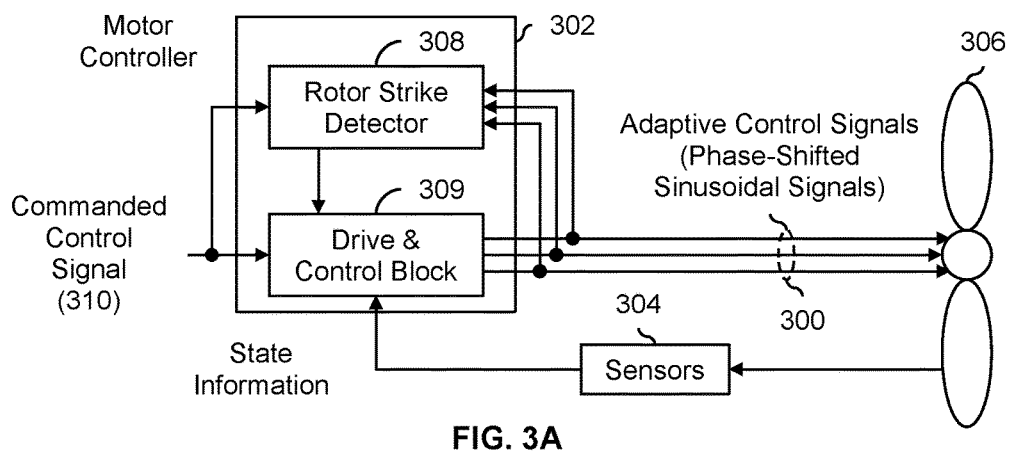
FIG. 3A is a block diagram illustrating an embodiment of rotor strike detection system which uses three phase-shifted sinusoidal signals as the adaptive control signal.

FIG. 3A is a block diagram illustrating an embodiment of rotor strike detection system which uses three phase-shifted sinusoidal signals as the adaptive control signal. In this example, the adaptive control signal (e.g., used at step 100 in FIG. 1 to detect a rotor strike) comprises three phase-shifted sinusoidal signals (300) which are referred to in the following figures as the A signal, the B signal, and the C signal. The signals are phase shifted with respect to each other where the B signal has a 120° phase offset from the A signal and the C signal has a 240° phase offset from the A signal.

The phase-shifted sinusoidal signals (300) are generated in this example by a motor controller (302) which includes a rotor strike detector (308) and drive and control block (309). The motor controller (and more specifically, the drive and control block) inputs a commanded control signal (310), state information from sensors (304), and a strike indication signal from rotor strike detector 308 in order to generate the three phase-shifted sinusoidal signals (300). For example, if a strike is signaled, then the adaptive control signals may be set to values which will "back off" the rotor's striking force (e.g., either by actively "braking" the rotor, or by exerting no new or additional torque so that the rotor eventually comes to a stop).

The phase-shifted sinusoidal signals (300) are passed to rotor 306 and control the rotation of the rotor (306). For example, as the magnitude and/or frequency of the phase-shifted sinusoidal signals increases, the rotor (306) attempts to rotate faster and/or with more torque. In some embodiments, the phase-shifted sinusoidal signals (or, more generally, the adaptive control signal) can indicate directionality of rotation. For example, one direction of rotation may be associated with normal operation (e.g., where in this direction the rotors provide the necessary lift for the aircraft to fly) and the other direction of rotation may be used as a brake (e.g., in the event a rotor strike is detected and the system is trying to bring the rotor to a stop as fast as possible).

The rotor (306) causes changes to the state of the rotor and these changes are measured by sensors (304) which output state information. In various embodiments, the state information from the sensors may relate to a measured RPM of the rotor, a measured torque of the rotor, etc. In various embodiments, the sensors may include GPS, gyroscopes, accelerometers, etc. For simplicity, only a single rotor is shown here but as FIG. 2A and FIG. 2B show, an aircraft may include more than one rotor and rotor strike detector and/or rotor force mitigation components may be duplicated for redundancy and/or to avoid a single point of failure.

To detect a rotor strike, rotor strike detector (308) inputs the commanded control signal (310) and the phase-shifted sinusoidal signals (300). Rotor strike detector (308) is one example of a block or component which performs step 100 in FIG. 1. In some embodiments, if there is some change in the phase-shifted sinusoidal signals (e.g., corresponding to an increase in the amount of torque and/or reduction in rotations per minute) which is not correspondingly reflected in the commanded control signal, then a rotor strike is flagged or otherwise identified.

In some embodiments, rotor strike detector (308) may be implemented as a field-programmable gate array (FPGA), which would tend to permit more complex and/or powerful rotor strike detection processing operations. Alternatively, the rotor strike detector may be implemented using a microprocessor (e.g., where the microprocessor is shared between a rotor strike detection process and other flight-related processes where less complex and/or less powerful rotor strike detection processing operations are supported).

Depending upon the state information and the commanded control signal, the motor controller (302) will adjust the phase-shifted sinusoidal signals as or if needed. The following figures show some examples of this.

Figure 3B:
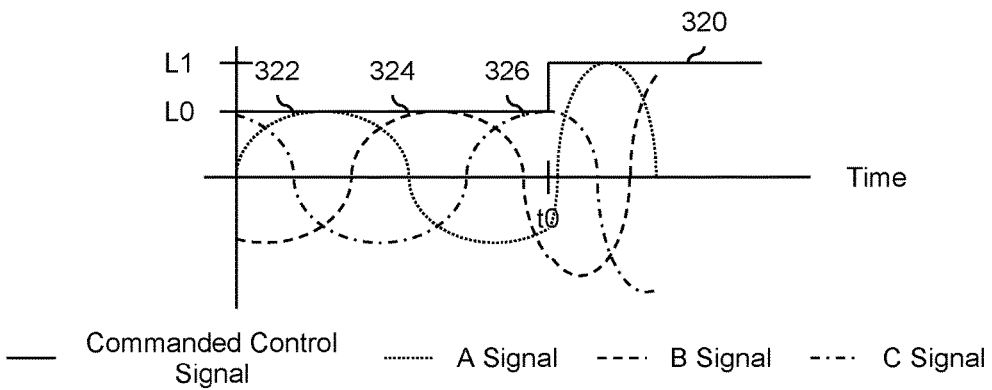
FIG. 3B is a graph illustrating an embodiment of an increase in an adaptive control signal (comprising phase-shifted sinusoidal signals) due to a commanded control signal.

FIG. 3B is a graph illustrating an embodiment of an increase in an adaptive control signal (comprising phase-shifted sinusoidal signals) due to a commanded control signal. In this example, the A signal (322), B signal (324), and C signal (326) are examples of adaptive control signals 300 in FIG. 3A. In this example, the magnitudes of signals 322, 324, and 326 increase, as do the frequencies of those signals, in response to the increase in the level or value of the commanded control signal (320). For example, a pilot may instruct the rotor or aircraft to go faster, and the rotor or aircraft responds accordingly.

Before time t0, the level of the commanded control signal (320) is at a first level (L0). In response to that signal level (and because the system is behaving perfectly in this example), the magnitudes of the three phase-shifted sinusoidal signals (322, 324, and 326) are at the same magnitude (i.e., L0). (For convenience and simplicity, all of the signals are shown at the same level, but the phase-shifted sinusoidal signals may have different magnitudes or signal levels compared to the commanded control signal.)

At time t0, the commanded control signal (320) increases to a second, higher level (L1). In response to that increase, the magnitudes and frequencies of the A signal (322), B signal (324), and C signal (326) increase so that they match the level of the commanded control signal (320) at L1. It is clear that in this example, the observed change in the magnitude and frequency of the A signal (322), B signal (324), and C signal (326) is due to the commanded control signal and not (as an example) to counter an external force.

Alternatively, the magnitude or level of the phase-shifted sinusoidal signals could change because of a rotor strike. The following figure shows an example of this.

Figure 3C:
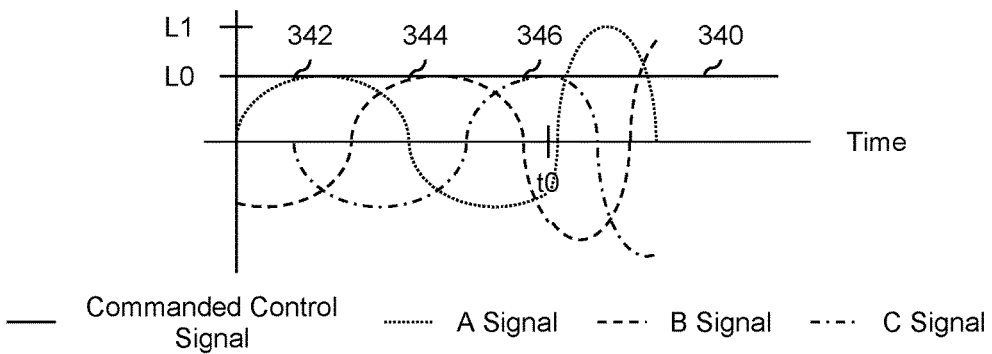
FIG. 3C is a graph illustrating an embodiment of an increase in an adaptive control signal (comprising phase-shifted sinusoidal signals) due to a rotor strike.

FIG. 3C is a graph illustrating an embodiment of an increase in an adaptive control signal (comprising phase-shifted sinusoidal signals) due to a rotor strike. In this example, the commanded control signal (340) remains at a same level (L0) the entire time. For convenience, the same time reference (t0) is shown in this figure as in the previous figure. In this example, the rotor encounters some resistance due to a rotor strike. In response, even though the commanded control signal (340) remains at the same level, the magnitudes and frequencies of the A signal (342), B signal (344), and C signal (346) increase so that the rotor will attempt to apply more torque in order to counter the resistance and satisfy the commanded control signal. It is noted that the response to a rotor strike is unpredictable and implementation dependent and this is just one example of how a rotor strike would affect an adaptive control signal comprising phase-shifted sinusoidal signals.

Returning to step 100 in FIG. 1, a scenario like the one shown in FIG. 3B shows an example where a rotor strike would not be declared (e.g., because the change in the phase-shifted sinusoidal signals corresponds and/or is corroborated by the change in the commanded control signal).

In contrast, FIG. 3C shows an example of something that would be flagged as a rotor strike (e.g., because the change in the frequency and/or amplitude of the phase-shifted sinusoidal signals is not due to or in response to some change in the commanded control signal).

To differentiate between the two scenarios shown in FIGS. 3B and 3C, a measurement threshold may be used to obtain some metric or measurement which in turn is used to decide whether to declare a rotor strike. The following figure shows an example of a measurement threshold which is based on the commanded control signal.

Figure 4:
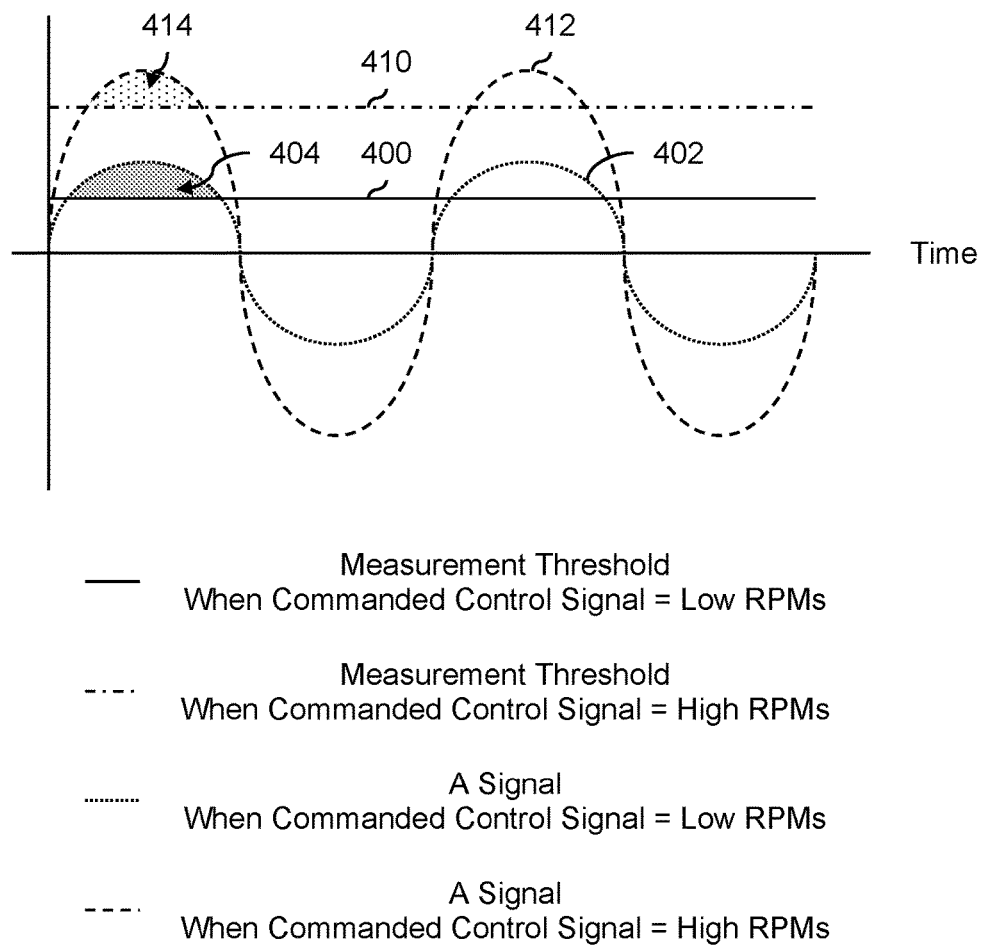
FIG. 4 is a diagram illustrating an embodiment of an adaptive measurement threshold which is based on a commanded control signal.

FIG. 4 is a diagram illustrating an embodiment of an adaptive measurement threshold which is based on a commanded control signal. In the example shown, the value of the measurement threshold is based upon the value of the commanded control signal. For this reason, the exemplary measurement threshold shown here is an adaptive measurement threshold as opposed to a fixed measurement threshold. In some embodiments, a fixed measurement threshold is used (e.g., where the measurement threshold does not vary or change with the commanded control signal).

In this example, to measure the degree to which a (phase-shifted) sinusoidal signal (e.g., signal 322, 324, or 326 in FIG. 3B or signal 342, 344, or 346 in FIG. 3C) is responding to resistance from the rotor (e.g., due to a rotor strike) as opposed to a change in the commanded control signal, the measurement threshold takes into account the value of the commanded control signal. As shown in FIGS. 3B and 3C, an increase in a (phase-shifted) sinusoidal signal could come from either resistance or the commanded control signal.

When the commanded control signal corresponds to a low RPM value (or, alternatively, a low torque value), the measurement threshold is set to first, lower value (400). When the commanded control signal corresponds to a high RPM (or, alternatively, torque) value, the measurement threshold is set to second, higher value (410). Two scenarios are shown here but naturally more than two measurement threshold levels or values may be used.

The measurement threshold is used to measure the degree or amount that one or more (phase-shifted) sinusoidal signals (e.g., which make up the adaptive control signal) do not correspond to the current commanded control signal. To preserve the readability of the graph, only the A signal is shown here; the corresponding B signal and C signal are not shown. Signal 402 shows an A signal when the commanded control signal corresponds to a low RPM value. An estimate or measurement of the area bounded by measurement threshold 400 and A signal 402 is performed, which corresponds to shaded region 404. This area (404) is compared against a second threshold (referred to herein as a detection threshold, not shown) and if the area exceeds this second/detection threshold, a rotor strike is declared.

The same decision making and/or comparison is performed when the commanded control signal corresponds to a high RPM value. In this scenario, dotted region 414 is a measurement of the area bounded by the measurement threshold (410) when the commanded control signal corresponds to a high RPM value and the A signal (412) when the commanded control signal corresponds to a high RPM value. This area (414) is then compared against a detection threshold (not shown) and if the detection threshold is exceeded, a rotor strike is declared. To put it another way, by adapting the measurement threshold to the commanded control signal, the strike detection threshold takes into account instances when the commanded control signal might be causing the adaptive control signal to change to a higher RPM or higher torque value.

In some embodiments, the detection threshold is set to a value which differentiates between normal and/or acceptable amounts of resistance which are relatively small versus large amounts of resistance which are probably indicative of a rotor strike. For example, it would be desirable to differentiate between changes in the adaptive control signal due to noise versus changes in the adaptive control signal due to a rotor strike (e.g., where the rotor at least temporarily slows down and/or is impeded).

Returning briefly to FIG. 3A, in some embodiments, rotor strike detector 308 monitors the commanded control signal (310) in real-time and updates an internal measurement threshold in real-time. This measurement threshold is then used to detect a rotor strike as described above. In some embodiments, rotor strike detector 308 uses a lookup table to map the value of the commanded control signal to a corresponding measurement threshold.

In this example, all of the signals are monitored, but a rotor strike is able to be declared even if only one of the signals has been processed and/or exhibits strike-like characteristics or properties. For applications where a fast decision is desired, this may be attractive. Alternatively, if accuracy is desired, more signals which exhibit strike-like characteristics (e.g., at least two signals have to exhibit strike-like characteristics) and/or exhibiting these characteristics over a longer period may be required before declaring a rotor strike. Although more accurate, this may be slower and depending upon the application or design constraints the appropriate technique may be used.

In some embodiments, instead of using a measurement threshold to obtain a metric or value (e.g., which is then compared against a detection threshold), a single threshold is used and threshold crossing is used to declare a rotor strike. For example, a rotor strike would be declared if signal 402 (412) crossed threshold 400 (410). In various embodiments, threshold crossing detecting may be used in combination with a fixed threshold or an adaptive threshold (e.g., some A above the commanded control signal).

This example of using a measurement threshold is merely one example of how a rotor strike may be detected. In some embodiments, some deviation from a (e.g., sinusoidal) reference signal (e.g., which varies depending upon the commanded control signal) may be used to detect a rotor strike. The following figure shows an example of this.

Figure 5:
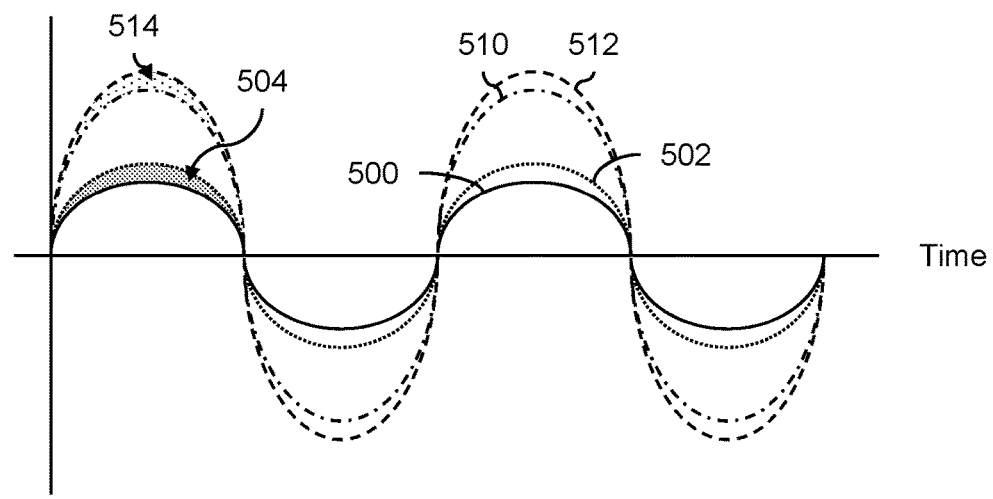
FIG. 5 is a diagram illustrating an embodiment of an adaptive sinusoidal reference signal which is based on a commanded control signal.

FIG. 5 is a diagram illustrating an embodiment of an adaptive sinusoidal reference signal which is based on a commanded control signal. In this example, the magnitude of the (sinusoidal) reference signal is selected based on the level or value of the commanded control signal. When the commanded control signal corresponds to a low RPM (or, alternatively, torque) value, a sinusoidal reference signal with a lower magnitude (500) is selected. When the commanded control signal corresponds to a high RPM value, a sinusoidal reference signal with higher magnitude (510) is selected.

The A signals (502 and 512) are then compared against their respective reference signals. Shaded area 504 shows the degree or amount that A signal 502 (when the commanded control signal is at a low RPM value) deviates from reference signal 500 (also when the commanded control signal is at a low RPM value). Dotted area 514 shows the degree or amount that A signal 512 (when the commanded control signal is at a high RPM value) deviates from reference signal 510 (also when the commanded control signal is at a high RPM value). As before, a measurement and/or estimate of the areas (504/514) is compared against a detection threshold (not shown) and a rotor strike is declared if the area exceeds the detection threshold.

As in the previous example, the commanded control signal may be monitored and the magnitude of the sinusoidal reference signal may be adjusted in response to any changes in the commanded control signal and/or a lookup table may be used to map the commanded control signal to a magnitude to use for the reference signal. In some embodiments, using a (e.g., sinusoidal) reference signal is faster at detecting a rotor strike than using a measurement threshold in combination with a detection threshold.

In some embodiments, a non-sinusoidal reference signal is used. For example, a sawtooth reference signal may be used where the signal is made of various lines for different segments.

The following figure describes the above examples more generally and/or formally in a flowchart.

Figure 6:
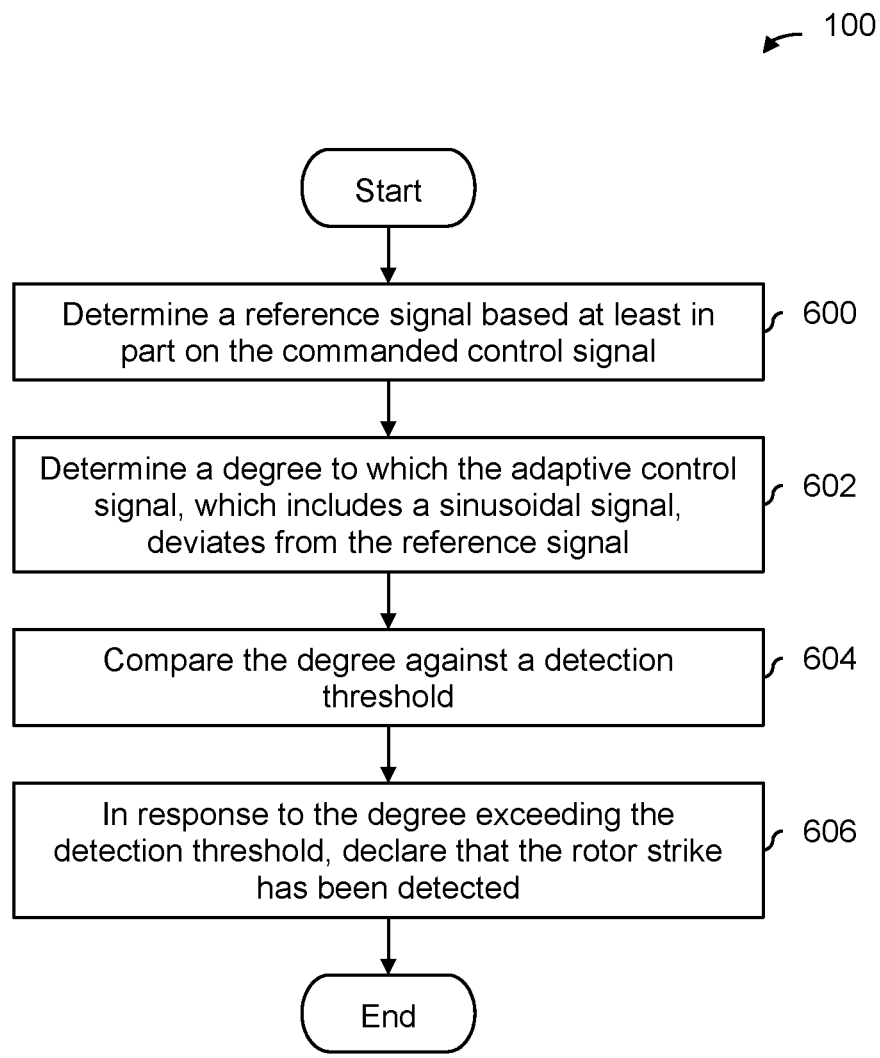
FIG. 6 is a flowchart illustrating an embodiment of a process to compare a commanded control signal against an adaptive control signal in order to detect a rotor strike.

FIG. 6 is a flowchart illustrating an embodiment of a process to compare a commanded control signal against an adaptive control signal in order to detect a rotor strike. In some embodiments, this process is used at step 100 in FIG. 1. Rotor strike detector 308 shows one example of a component which may perform the process of FIG. 6.

At 600, a reference signal is determined based at least in part on the commanded control signal. For example, measurement thresholds 400 and 410 from FIG. 4 are examples of a reference signal where the value of the measurement threshold varies depending upon the RPM (or, alternatively, torque) value indicated by the commanded control signal. In FIG. 5, sinusoidal reference signals 500 and 510 (e.g., where the magnitude of the reference signal depends upon the RPM or torque value indicated by the commanded control signal) show another example of a reference signal which is determined at step 600.

At 602, a degree to which the adaptive control signal, which includes a sinusoidal signal, deviates from the reference signal is determined. For example, in FIG. 4, an estimate or measurement of shaded area 404 or dotted area 414 is performed. In the example of FIG. 5, shaded area 504 or dotted area 514 is measured or otherwise estimated.

At 604, the degree is compared against a detection threshold. For example, shaded area 404 or dotted area 414 in FIG. 4 is compared against some detection threshold. Or, shaded area 504 or dotted area 514 in FIG. 5 is compared against the detection threshold.

At 606, in response to the degree exceeding the detection threshold, it is declared that the rotor strike has been detected. As described above, the detection threshold may be used to differentiate between relatively low and/or typical amounts of deviation (e.g., due to relatively low and/or acceptable amounts of resistance, for example, due to noise or small errors) versus relatively high and/or atypical amounts of deviation (e.g., due to a rotor strike). Alternatively, if the detection threshold is not exceeded, then no rotor strike is declared.

Returning briefly to step 102 in FIG. 1, in response to detecting the rotor strike, a control signal to the rotor is adjusted in order to reduce a striking force associated with the rotor. The following figures show some examples of this.

Figure 7A:
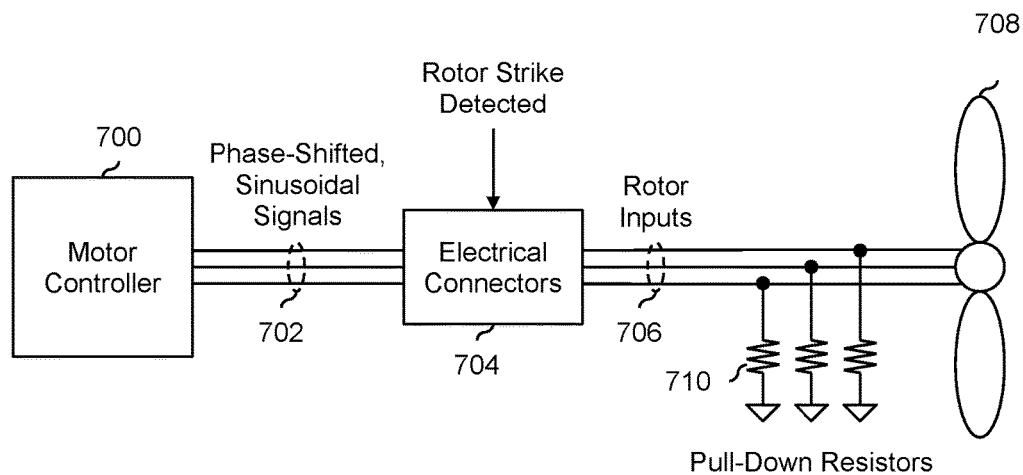
FIG. 7A is a diagram illustrating an embodiment of electrical connectors and pull-down resistors which are used to adjust a control signal to the rotor in order to reduce a striking force.

FIG. 7A is a diagram illustrating an embodiment of electrical connectors and pull-down resistors which are used to adjust a control signal to the rotor in order to reduce a striking force. In the example shown, motor controller 700 inputs a commanded control signal (not shown) and outputs an adaptive control signal in the form of three phase-shifted sinusoidal signals (702).

The phase-shifted sinusoidal signals are passed to electrical connectors 704. During normal operation, the electrical connectors pass what is observed at the input (i.e., phase-shifted sinusoidal signals 702) through to the output (i.e., rotor inputs 706). In this scenario, the rotor (708) would receive and be controlled by the phase-shifted sinusoidal signals (702).

However, if a rotor strike is detected, the electrical connectors will (e.g., at least electrically) disconnect the phase shifted sinusoidal signals (702) from the rotor inputs (706) so that those signals are no longer driven. In the absence of any driving signal (e.g., when the electrical connectors (704) have disconnected the phase-shifted sinusoidal signals (702) from the rotor inputs (706)), the pull-down resistors (710) will pull the rotor inputs (706) to ground. Pull-up resistors are similar to pull-down resistors except they are connected to power as opposed to ground and in some embodiments a pull-up resistor is used to stop a rotor in a manner similar to that shown here. The value set by the pull-down resistors at the rotor input (at least in this example) corresponds to either a neutral value (e.g., where no braking force is applied to the rotor) or a value which causes a braking force to be applied to the rotor.

In some embodiments, the electrical connectors (704) are reversible connectors so that (if desired) the phase-shifted sinusoidal inputs (702) can again be passed through to the rotor inputs (706). For example, a switch (which can be opened or closed) can be reversed. Alternatively, the electrical connectors may comprise irreversible connectors, such as a fuse which would need to be replaced once it is blown.

The exemplary system is attractive for a number of reasons. First, it is relatively inexpensive and lightweight, both of which are attractive in low-cost, (ultra)lightweight aircraft applications. It is also simple to implement. Again, for aircraft applications, simplicity is desirable because it is less likely to fail. Lastly, the system is relatively fast. Switching the electrical connectors 704 is relatively fast, so the aircraft can respond quickly once a rotor strike is detected (which is desirable in case a rotor is striking a person).

The following figure shows another embodiment, where existing components in the motor controller are used to reduce a striking force when a rotor strike is detected.

Figure 7B:
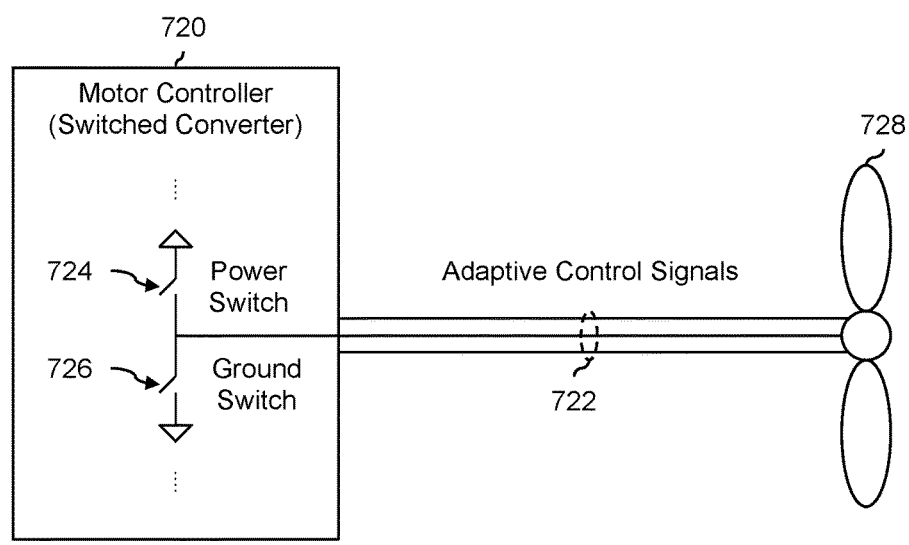
FIG. 7B is a diagram illustrating an embodiment of built-in switches in a switched converter which are used to adjust a control signal to the rotor in order to reduce a striking force.

FIG. 7B is a diagram illustrating an embodiment of built-in switches in a switched converter which are used to adjust a control signal to the rotor in order to reduce a striking force. In this example, the motor controller (720) includes a switched converter. A switched converter is a type of circuit which is used to convert one voltage (e.g., 10 V) into another voltage (e.g., 5 V) using switches. The exemplary switched controller actually has a total of three pairs of switches (e.g., each of which generates a corresponding phase-shifted, sinusoidal signal) but to preserve the readability of the figure, only a single pair of switches is shown here.

To generate a 5 V signal from a 10 V power supply (as an example), the switches are opened and closed in a specific pattern. First, power switch 724, which connects the output signal (i.e., the relevant one of the adaptive control signals) to the 10 V power supply, is closed for some time t while ground switch 726 (which connects the output signal to ground) is open. With the switches in this position, the output signal is connected to the 10 V power supply and not ground so that the output signal is at 10 V for a duration of t.

Then, the switches are reversed for the same amount of time t: the power switch (724) is opened so that the output is electrically disconnected from the 10 V power supply, and the ground switch (726) is closed so that the output signal is electrically connected to ground. The causes the output signal to be 0 V for a duration of t.

This process is repeated so that a square wave with a 50% duty cycle is produced which alternates between 10 V and 0 V which corresponds to a 5 V signals. These phase-shifted, sinusoidal signals (722) produced are then passed to the rotor, where the amplitude and phase control the rotor (e.g., the torque and rotational speed, respectively).

If a strike is detected, these built-in switches can be used to reducing the striking force of rotor 728. In some embodiments, both the power switch (724) and ground switch (726) are opened so that the output signal (i.e., one of the phase-shifted, sinusoidal signals) is connected to neither power nor ground so that it is floating). This floating value would cause the rotor to gradually come to a stop (e.g., with inertia causing the rotor to continue rotating, at least at first). Although the rotor is still spinning (at least at first), the striking force is reduced and there is no sudden generation of heat.

Alternatively, if a sudden, braking stop is desired, the ground switch (726) can be closed and the power switch (724) can be opened so that the output signal (i.e., one of the phase-shifted, sinusoidal signals) is connected to ground. This would cause the rotor to come to a sudden, braking stop. The downside is that a large amount of heat would be generated (e.g., there may be a burning smell).

A benefit to using built-in switches in a switched converter is that it does not require new or additional parts since the motor controller already includes a switched converter. In contrast, even though the electrical connectors (704) and pull-down resistors (710) in FIG. 7A may be relatively small, cheap, and/or lightweight, they are still new or additional parts which were not originally in the design.

The following figures describe these examples more generally and/or formally in flowcharts.

Figure 8A:
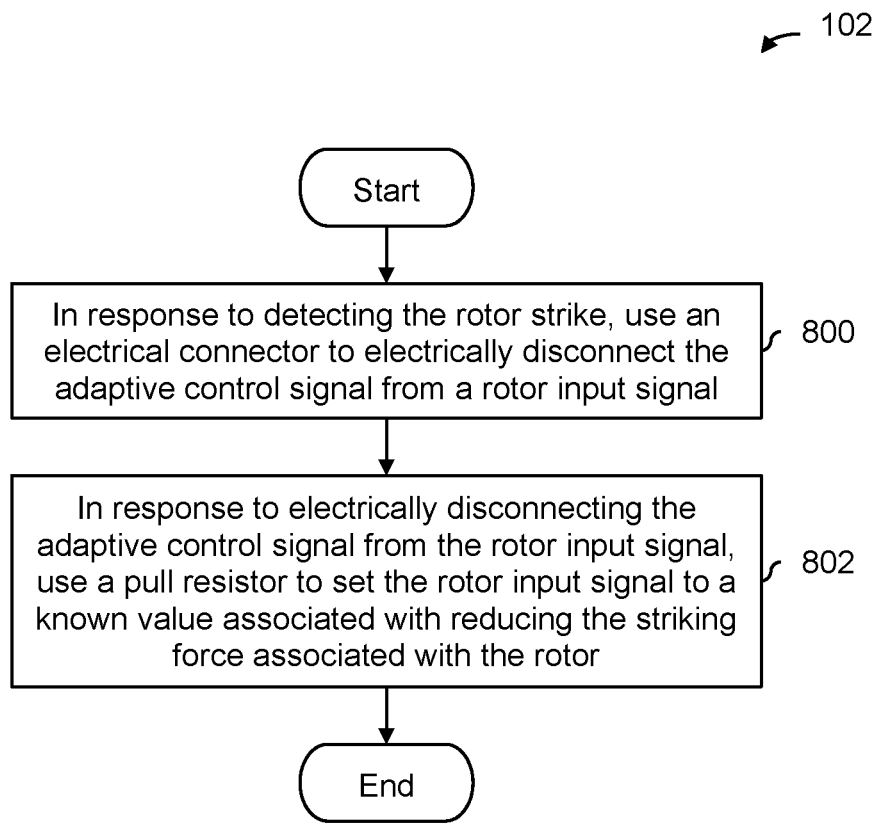
FIG. 8A is a flowchart illustrating an embodiment of a process to adjust a control signal to the rotor in order to reduce a striking force using a pull resistor.

FIG. 8A is a flowchart illustrating an embodiment of a process to adjust a control signal to the rotor in order to reduce a striking force using a pull resistor. In some embodiments, the example process shown here is used at step 102 in FIG. 1.

At 800, in response to detecting the rotor strike, an electrical connector is used to electrically disconnect the adaptive control signal from a rotor input signal. See, for example, electrical connectors 704 in FIG. 7A which use the rotor strike detected signal as the control or select signal. In that example, the adaptive control signal comprises three phase-shifted sinusoidal signals but, naturally, in some other embodiments, the adaptive control signal may comprise something else. As described above, an electrical connector may be a switch, a fuse, etc.

At 802, in response to electrically disconnecting the adaptive control signal from the rotor input signal, a pull resistor is used to set the rotor input signal to a known value associated with reducing the striking force associated with the rotor. See, for example, pull-down resistors 710 in FIG. 7A. If the electrical connectors (704) electrically disconnect the phase-shifted sinusoidal signals (702) from the rotor inputs (706), then the pull-down resistors will bring the rotor inputs (706) to a known value, specifically zero or ground. A pull resistor (e.g., referred to in step 802) may in some other embodiments be a pull-up resistor connected to power.

In an aircraft application, what constitutes an appropriate response to a rotor strike being detected (e.g., at step 102 in FIG. 1) may depend upon the altitude of the aircraft when a rotor strike is detected. The following figures show an example of this, where an aircraft's altitude is taken into consideration.

Figure 8B:
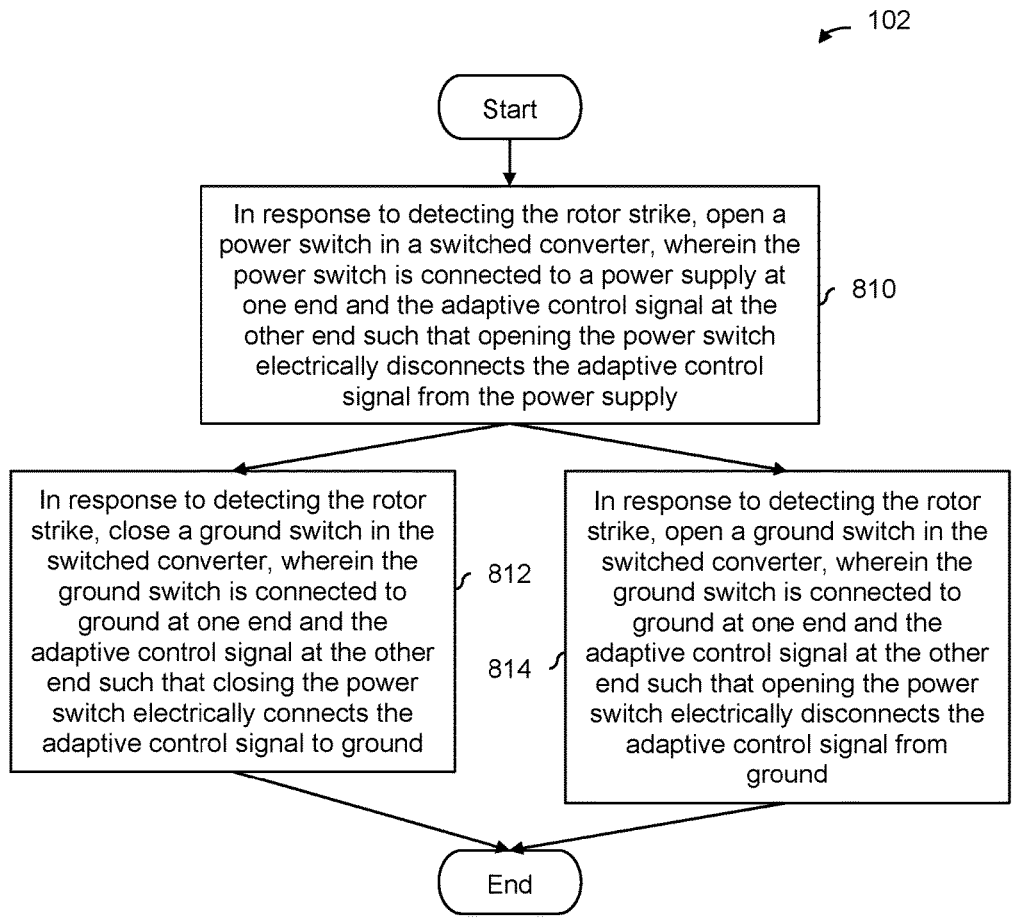
FIG. 8B is a flowchart illustrating an embodiment of a process to adjust a control signal to the rotor in order to reduce a striking force using built-in switches in a switched converter.

FIG. 8B is a flowchart illustrating an embodiment of processes to adjust a control signal to the rotor in order to reduce a striking force using built-in switches in a switched converter. In some embodiments, one of the example processes shown here is used at step 102 in FIG. 1.

At 810, in response to detecting the rotor strike, a power switch in a switched converter is opened, wherein the power switch is connected to a power supply at one end and the adaptive control signal at the other end such that opening the power switch electrically disconnects the adaptive control signal from the power supply. For example, motor controller 720 in FIG. 7B includes a switched controller with three pairs of switches (not all of which are shown). All of the power switches (724) would be opened so that adaptive control signals (722) are not connected to the power supply.

For brevity, two processes are shown here, where the ground switch (e.g., ground switch 726 in FIG. 7B) can either be open (e.g., so that the adaptive control signal is floating) or closed (e.g., so that the adaptive control signal is connected to ground) as described above.

At 812, in response to detecting the rotor strike, a ground switch in the switched converter is closed, wherein the ground switch is connected to ground at one end and the adaptive control signal at the other end such that closing the power switch electrically connects the adaptive control signal to ground. For example, in FIG. 7B, all of the ground switches (726) would be closed. This would cause all of the adaptive control signals (722) to be low (i.e., at the ground value, which would bring rotor 728 to a sudden and/or braking halt).

Alternatively, at 814, in response to detecting the rotor strike, a ground switch in the switched converter is opened, wherein the ground switch is connected to ground at one end and the adaptive control signal at the other end such that opening the power switch electrically disconnects the adaptive control signal from ground. For example, in FIG. 7B, all of the ground switches (726) would be opened. This would cause all of the adaptive control signals (722) to be floating (e.g., which would bring rotor 728 to a gradual stop).

In some embodiments, altitude and/or other state information (e.g., associated with the aircraft overall, as opposed to the state of one of the rotors) is used in deciding how to respond if a rotor strike is detected. The following figures show some examples of this.

Figure 9A:
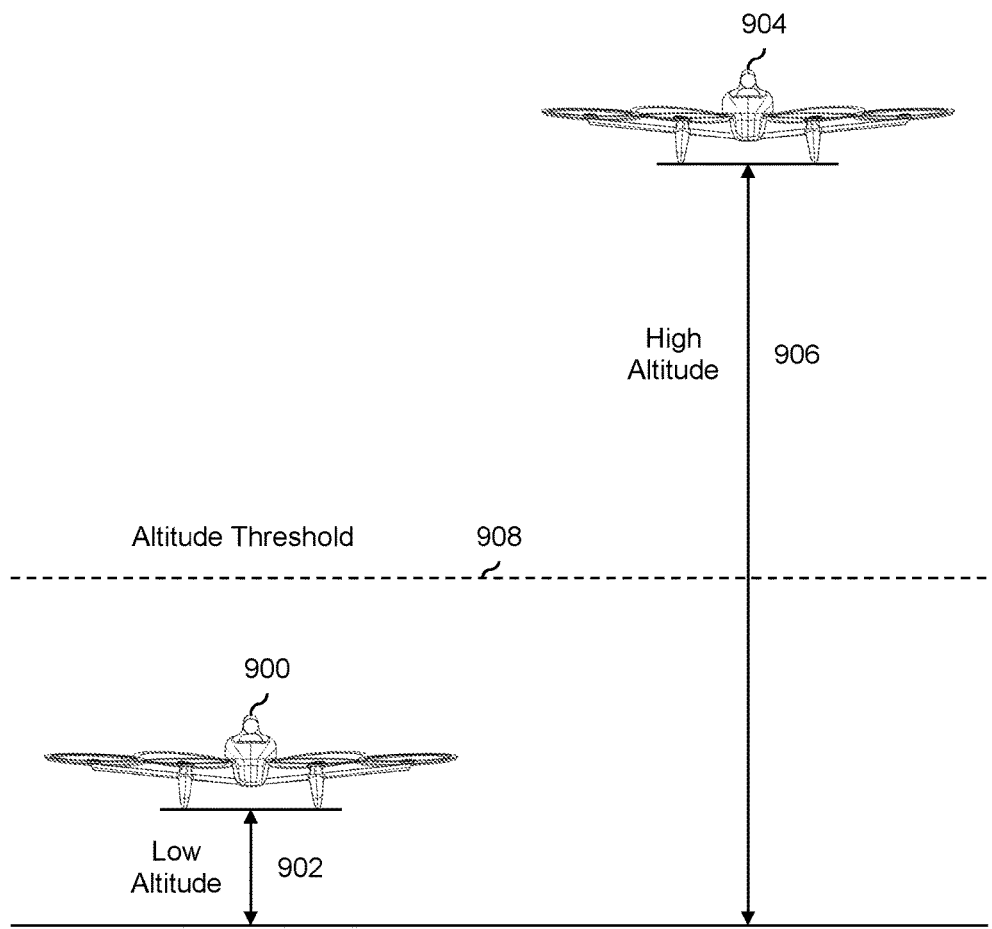
FIG. 9A is a diagram illustrating an embodiment of a single altitude threshold which is used in responding to a detected rotor strike.

FIG. 9A is a diagram illustrating an embodiment of a single altitude threshold which is used in responding to a detected rotor strike. In the example shown, aircraft 900 is at a relatively low altitude (902) where a hard landing is relatively safe (e.g., for the pilot and/or with respect to damage to the aircraft). For example, the low altitude (902) may be on the order of 5-10 feet off the ground. In this example, because a hard landing is relatively safe at this altitude (902), the response to a rotor strike detection can favor (if desired) reducing the striking force of the rotor, even at the expensive of the aircraft's ability to remain airborne.

In contrast, aircraft 904 is at a relatively high altitude (906), for example, on the order of tens or hundreds of feet off the ground. At this altitude, a hard landing is unsafe for the pilot and the aircraft's ability to remain airborne is a more important consideration than when the aircraft is at the low altitude (902). At this high altitude (906), the response to a rotor strike detection takes into account both the desire to reduce the striking force of the rotor, as well as keeping the aircraft airborne (e.g., at least to a degree necessary for a safe landing).

For example, suppose a rotor strike is detected. The aircraft's altitude at that time is obtained, for example, using GPS or a downward-facing sensor such as radar, sonar, or lidar (e.g., which is not dependent upon having a good line-of-sight and/or communication channel to a GPS satellite). The obtained altitude is compared against altitude threshold 908. If the aircraft's altitude when the rotor strike is detected is below the altitude threshold (908), the rotor's striking force is reduced in a semi-permanent manner, for example, at least until the rotor and/or some associated components or electronics are reset or otherwise replaced. For example, if electronic connectors 704 in FIG. 7 comprise fuses and the fuses were blown (e.g., because the aircraft's altitude at the time of the rotor strike was below the altitude threshold), then the aircraft would need to land and the fuses would need to be replaced before that rotor could rotate again. Alternatively, the aircraft could land and the rotor and/or its associated components or electronics could be reset through some user interface. In other words, reducing a rotor's striking force in a semi-permanent manner will prevent the rotor from restarting midair since it will need to land and components will need to be replaced and/or reset for the rotor to be operational again.

At higher altitudes, the ability to restart a rotor midair (sometimes referred to herein as a flying restart) may be desirable in order to keep the aircraft airborne or at least slow the descent of the aircraft to the ground. In this example, if a rotor strike is detected at an altitude above altitude threshold 908, the rotor's striking force is reduced temporarily. For example, immediately after a rotor strike is detected at such altitudes, the rotor is slowed down or otherwise stopped (e.g., using a neutral value or a braking force). If desired, the rotor is permitted to gradually start up again, beginning at a relatively low RPM or torque and then gradually increasing the RPM or torque. For example, a step function of gradually increasing RPMs or torques may be specified or otherwise passed to the rotor. If, at any point during the step function, another rotor strike is detected, the step function will stop and the rotor's striking force will again be reduced (e.g., again temporarily). This may permit the aircraft to reduce the striking force at least temporarily (e.g., giving the pilot and/or the person or thing being struck time to separate) while still getting at least some lift out of the affected rotor as opposed to no lift from the rotor once a rotor strike is detected.

In some embodiments, for safety reasons, a flying restart (which in this example assumes that the aircraft's altitude is above the altitude threshold) is only permitted if it is triggered or otherwise initiated by a pilot. For example, it may be dangerous to let some automated process initiate a flying restart (e.g., in case the person or object being struck is still within striking distance of one of the rotors). In contrast, a pilot could visually inspect the area around the aircraft after a rotor strike is detected, visually verify that the area surrounding the aircraft is clear, and then restart the affected rotor (if desired).

In some embodiments, a user interface displays or otherwise presents a flying restart button in response to a rotor strike being detected in order to more quickly facilitate a flying restart (e.g., so that the pilot does not have to navigate through a sequence of pages or screens in order to find the correct page or screen). In some embodiments, such a button is presented via a touchscreen display. In some embodiments where the display is not a touchscreen display, the display may indicate some sequence or combination of inputs via the hand controls which would be interpreted as an instruction to perform a flying restart.

In some embodiments, multiple altitude thresholds are used. The following figure shows an example of this.

Figure 9B:
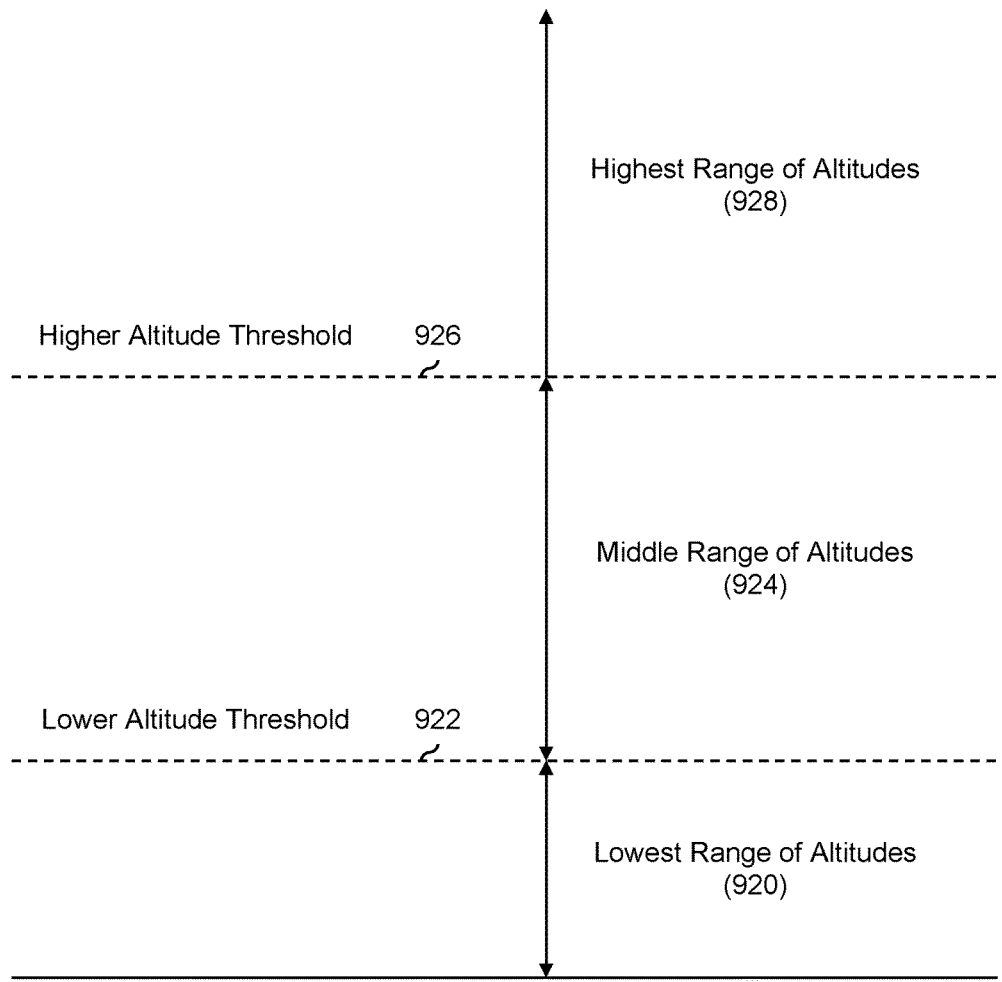
FIG. 9B is a diagram illustrating an embodiment of two altitude thresholds which are used in responding to a detected rotor strike.

FIG. 9B is a diagram illustrating an embodiment of two altitude thresholds which are used in responding to a detected rotor strike. In this example, there are three altitude ranges or zones. In the lowest range of altitudes (e.g., below the lower altitude threshold (922)), a hard landing and/or crash is not likely to be deadly or dangerous for the pilot (e.g., if one rotor is stopped due to a strike being detected on that rotor or otherwise goes out). Also, in this range of altitudes, the multicopter could have hit a person. For this reason, in this example, the striking force is reduced on a given rotor if a strike is detected on that rotor (e.g., per the process of FIG. 1), for example gradually or using a sudden, braking stop as desired.

In middle range of altitudes 924 (i.e., between the lower altitude threshold (922) and higher altitude threshold (926), the multicopter is at a height or altitude where it is unlikely to strike a person. Also, in this range of altitudes, even if the aircraft has a ballistic recovery system (i.e., a parachute system which uses a rocket or other ballistic system to help the parachute inflate), the aircraft is too low to the ground for the ballistic recovery system to sufficiently slow down the aircraft. In other words, a hard landing or crash in this range of altitudes could be dangerous or deadly to the pilot, even if the aircraft is equipped with a ballistic recovery system (or, more generally, a parachute or recovery system, including non-ballistic ones that do not use rockets or ballistics to inflate). For these reasons, in this example, in this middle range of altitudes, the aircraft "powers through" and does not reduce the striking force of a rotor, even if a strike is detected at that rotor.

In the highest range of altitudes (928) above the higher altitude threshold (926), the aircraft is unlikely to strike a person and a ballistic recovery system would have enough time (if deployed) to slow a falling aircraft down sufficiently to land relatively safely. For these reasons, in this example, in this highest range of altitudes, the striking force is reduced (e.g., per the process of FIG. 1).

In some embodiments (e.g., due to the likelihood of striking a person in the highest range of altitudes and lowest range of altitudes), the striking force of a rotor is reduced using a sudden, braking stop in the lowest range of altitudes (920) if a rotor strike is detected, whereas a gradual stop is used in the highest range of altitudes (928). Both reduce the striking force of the striking rotor, but rotor is brought to a stop after different durations.

In some embodiments, the direction of movement is also used to respond to a strike detection. For example, suppose that instead of ascending straight up through the lowest range of altitudes, the pilot decides to fly low to the ground or takes off in a diagonal manner (e.g., simultaneously moving upwards and forwards). If so, a strike is more likely to occur in the leading rotors. In some embodiments, the response to a detected rotor strike depends upon whether the rotor is a leading rotor (e.g., one of the front rotors if the aircraft is flying forwards) or a non-leading rotor (e.g., one of the side or back rotors if the aircraft if flying forwards). In some embodiments, a leading rotor is brought to a sudden, braking halt if a strike is detected, whereas a non-leading rotor is gradually brought to a stop. This may minimize heat generation due to sudden, braking stops of a rotor.

These examples are described more formally and/or generally in flowcharts below.

Figure 10A:
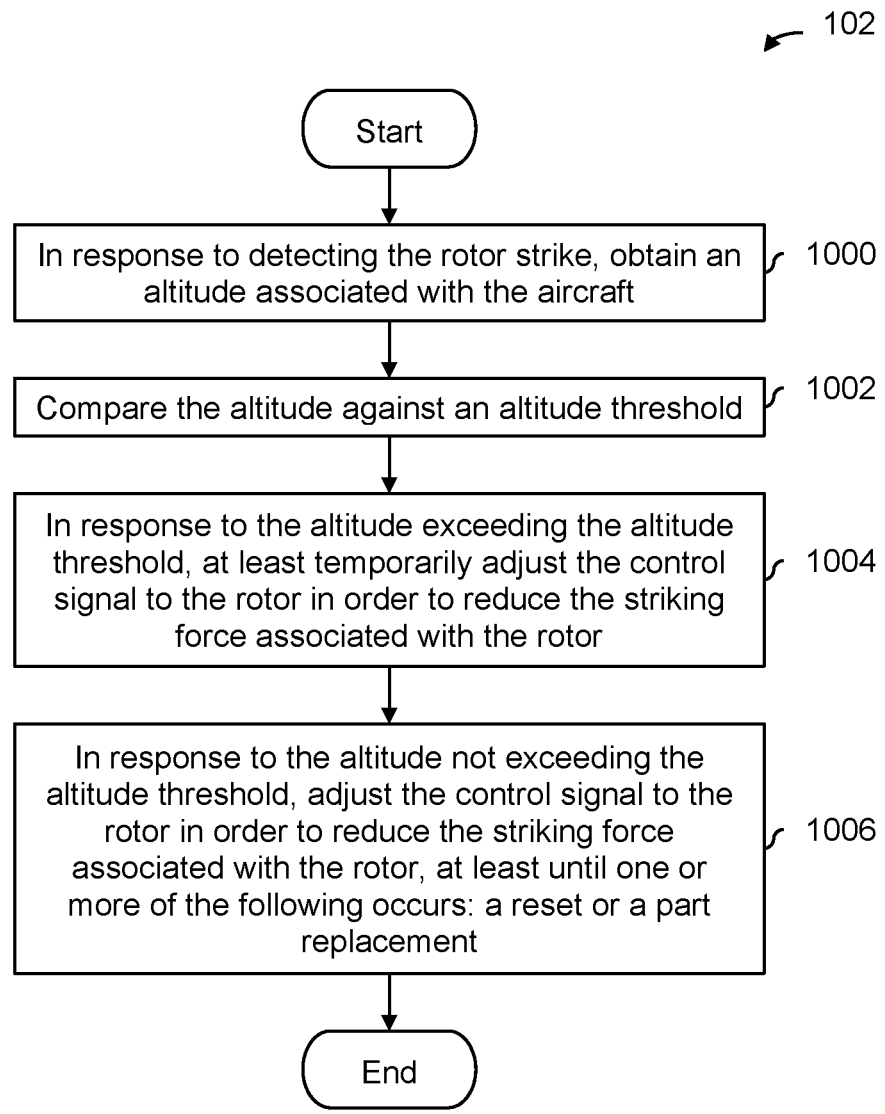
FIG. 10A is a flowchart illustrating an embodiment of a process to adjust the control signal to the rotor in order to reduce the striking force associated with the rotor using altitude and an altitude threshold.

FIG. 10A is a flowchart illustrating an embodiment of a process to adjust the control signal to the rotor in order to reduce the striking force associated with the rotor using altitude and an altitude threshold. In some embodiments, the process of FIG. 10A is used at step 102 in FIG. 1.

At 1000, in response to detecting the rotor strike, an altitude associated with the aircraft is obtained. For example, as described above, a variety of sensors including GPS, radar, sonar, lidar, and such may be used to obtain the altitude of the aircraft.

At 1002, the altitude is compared against an altitude threshold. As described above, in various embodiments, the altitude threshold may be used to differentiate between the type of object being struck (e.g., at low altitudes there is a high(er) likelihood of striking a person whereas at high altitudes there is a low(er) likelihood of striking a person) or a safe versus unsafe height at which to have a hard or crash landing. In some embodiments, two or more altitude thresholds are used.

At 1004, in response to the altitude exceeding the altitude threshold, the control signal to the rotor is at least temporarily adjusted in order to reduce the striking force associated with the rotor. For example, the affected rotor may be permitted (e.g., under certain conditions, after a certain amount of time, if so instructed by a pilot, etc.) to do a flying restart (e.g., without landing and/or without resetting or replacing something). As described above, it may be safer to let the rotor restart at high altitudes in order to prevent or otherwise mitigate a hard or crash landing.

At 1006, in response to the altitude not exceeding the altitude threshold, the control signal to the rotor is adjusted in order to reduce the striking force associated with the rotor, at least until one or more of the following occurs: a reset or a part replacement. For example, the affected rotor would not be permitted to restart until there was a reset or a part was replaced. Presumably this happens on the ground and presumably this happens after the person or object being struck is no longer in danger of being struck.

Figure 10B:
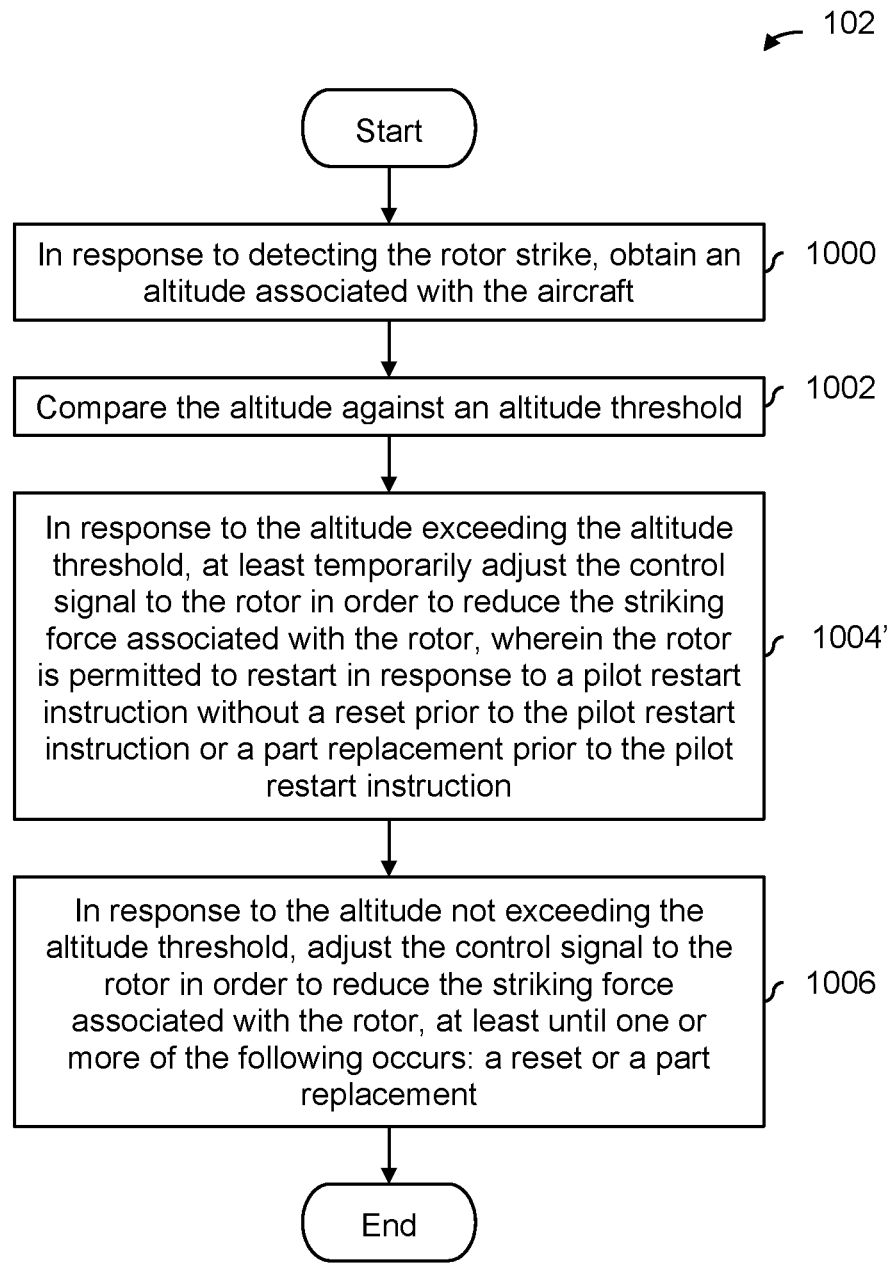
FIG. 10B is a flowchart illustrating an embodiment of a process to adjust the control signal to the rotor in order to reduce the striking force associated with the rotor using altitude and an altitude threshold where a pilot is permitted to restart the rotor.

FIG. 10B is a flowchart illustrating an embodiment of a process to adjust the control signal to the rotor in order to reduce the striking force associated with the rotor using altitude and an altitude threshold where a pilot is permitted to restart the rotor. In some embodiments, the process of FIG. 10B is used at step 102 in FIG. 1. FIG. 10B is similar to FIG. 10A and the same or similar reference numbers are used to indicate the same or similar steps.

At 1000, in response to detecting the rotor strike, an altitude associated with the aircraft is obtained.

At 1002, the altitude is compared against an altitude threshold.

At 1004', in response to the altitude exceeding the altitude threshold, the control signal to the rotor is at least temporarily adjusted in order to reduce the striking force associated with the rotor, wherein the rotor is permitted to restart in response to a pilot restart instruction without a reset prior to the pilot restart instruction or a part replacement prior to the pilot restart instruction. As described above, it may be safer to let a pilot control any flying restart because the pilot can make a visual inspection and confirm there is nothing which would be hit by the affected rotor if that rotor were restarted.

At 1006, in response to the altitude not exceeding the altitude threshold, the control signal to the rotor is adjusted in order to reduce the striking force associated with the rotor, at least until one or more of the following occurs: a reset or a part replacement.

Figure 10C:
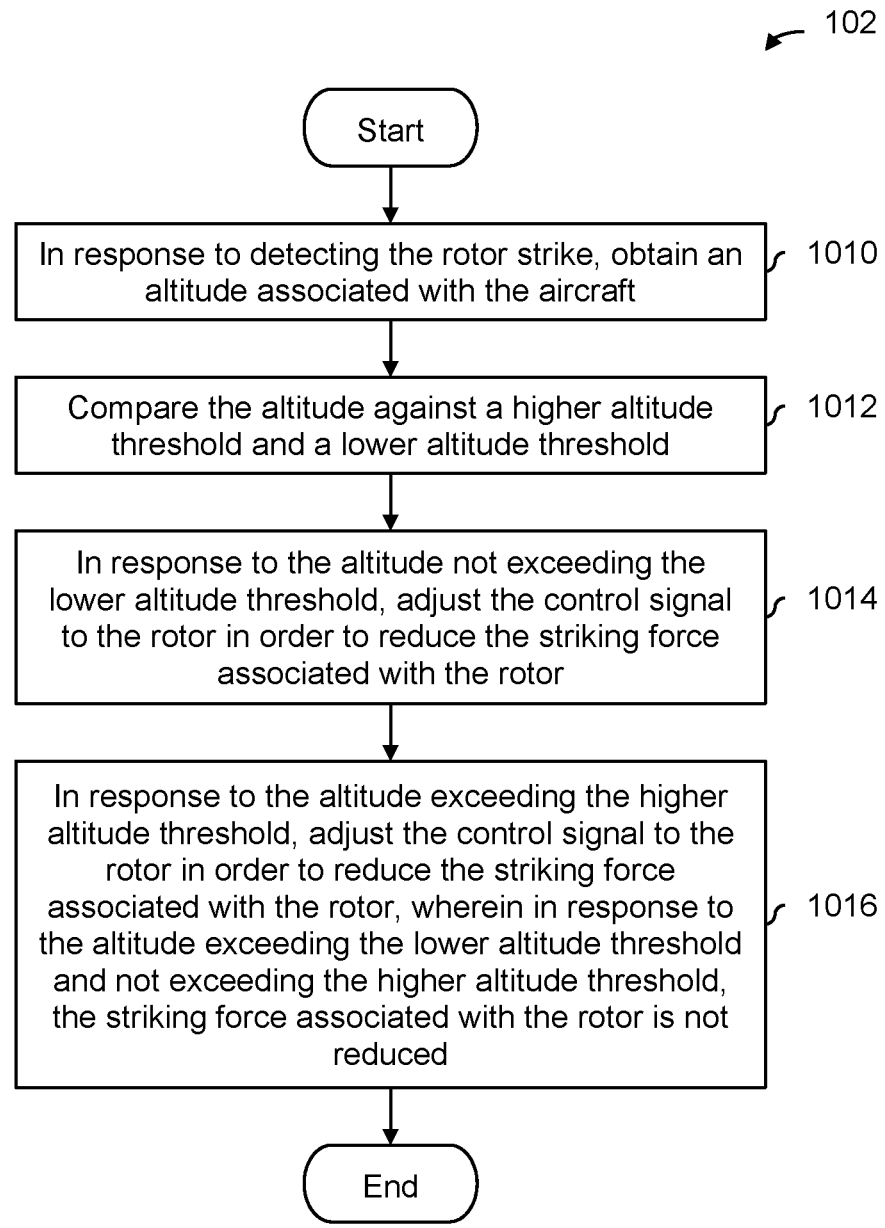
FIG. 10C is a flowchart illustrating an embodiment of a process to adjust the control signal to the rotor in order to reduce the striking force associated with the rotor using two altitude thresholds when there is a parachute system.

FIG. 10C is a flowchart illustrating an embodiment of a process to adjust the control signal to the rotor in order to reduce the striking force associated with the rotor using two altitude thresholds when there is a parachute system. In some embodiments, the process of FIG. 10C is used at step 102 in FIG. 1.

At 1010, in response to detecting the rotor strike, an altitude associated with the aircraft is obtained.

At 1012, the altitude is compared against a higher altitude threshold and a lower altitude threshold. As described above, in some embodiments, below the lower altitude threshold, the aircraft may be able to crash safely and includes altitudes where the aircraft may strike people. In some embodiments, the higher altitude threshold may be associated with a cutoff altitude above which a (e.g., ballistic) recovery system is able to sufficiently slow an aircraft down for a safe landing (and below which, the recovery system would not have enough time to deploy and slow the aircraft down sufficiently).

At 1014, in response to the altitude not exceeding the lower altitude threshold, the control signal to the rotor is adjusted in order to reduce the striking force associated with the rotor. See, for example, the description of how the system responds in the lowest range of altitudes (920) in FIG. 9B.

At 1016, in response to the altitude exceeding the higher altitude threshold, the control signal to the rotor is adjusted in order to reduce the striking force associated with the rotor, wherein in response to the altitude exceeding the lower altitude threshold and not exceeding the higher altitude threshold, the striking force associated with the rotor is not reduced. See, for example, the description for how the exemplary aircraft in FIG. 9B responds to a rotor strike being detected in the highest range of altitudes (928) and the middle range of altitudes (924).

In some embodiments, as described above, there is further differentiation in the lowest altitude threshold (e.g., for leading rotors versus non-leading rotors). In some embodiments, rotors in the lowest altitude threshold are stopped immediately if a rotor strike is detected, whereas rotors in the highest altitude threshold are stopped gradually if a rotor strike is detected (e.g., where both approaches would still reduce the striking force of the rotor).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor; and
 a memory coupled with the processor, wherein the memory is configured to provide the processor with instructions which when executed cause the processor to:
  detect a rotor strike including by comparing a commanded control signal against an adaptive control signal, wherein the rotor strike is caused by a rotor included in an aircraft striking an object and the adaptive control signal is associated with controlling the rotor and the adaptive control signal varies based at least in part on the commanded control signal and state information associated with the rotor; and
  in response to detecting the rotor strike, adjust a control signal to the rotor to change rotation of the rotor to reduce a striking force applied to the object being struck by the rotor and prevent damage to at least one of the object being struck and the rotor during at least one of: take-off, landing, and flying at a steady altitude.

2. The system recited in claim 1, wherein the instructions for comparing the commanded control signal against the adaptive control signal in order to detect the rotor strike include instructions for:
   determining a reference signal based at least in part on the commanded control signal;
   determining a degree to which the adaptive control signal, which includes a sinusoidal signal, deviates from the reference signal;
   comparing the degree against a detection threshold; and
   in response to the degree exceeding the detection threshold, declaring that the rotor strike has been detected.

3. The system recited in claim 1, wherein the instructions for comparing the commanded control signal against the adaptive control signal in order to detect the rotor strike include instructions for:
   determining a reference signal based at least in part on the commanded control signal, wherein the reference signal includes a measurement threshold;
   determining a degree to which the adaptive control signal, which includes a sinusoidal signal, deviates from the reference signal;
   comparing the degree against a detection threshold; and
   in response to the degree exceeding the detection threshold, declaring that the rotor strike has been detected.

4. The system recited in claim 1, wherein the instructions for comparing the commanded control signal against the adaptive control signal in order to detect the rotor strike include instructions for:
   determining a reference signal based at least in part on the commanded control signal, wherein the reference signal includes a sinusoidal reference signal;
   determining a degree to which the adaptive control signal, which includes a sinusoidal signal, deviates from the reference signal;
   comparing the degree against a detection threshold; and
   in response to the degree exceeding the detection threshold, declaring that the rotor strike has been detected.

5. The system recited in claim 1, wherein the instructions for adjusting the control signal to the rotor in order to reduce the striking force include instructions for:
   in response to detecting the rotor strike, using an electrical connector to electrically disconnect the adaptive control signal from a rotor input signal; and
   in response to electrically disconnecting the adaptive control signal from the rotor input signal, using a pull resistor to set the rotor input signal to a known value associated with reducing the striking force associated with the rotor.

6. The system recited in claim 1, wherein the instructions for adjusting the control signal to the rotor in order to reduce the striking force include instructions for:
   in response to detecting the rotor strike, opening a power switch in a switched converter, wherein the power switch is connected to a power supply at one end and the adaptive control signal at the other end such that opening the power switch electrically disconnects the adaptive control signal from the power supply; and
   in response to detecting the rotor strike, closing a ground switch in the switched converter, wherein the ground switch is connected to ground at one end and the adaptive control signal at the other end such that closing the power switch electrically connects the adaptive control signal to ground.

7. The system recited in claim 1, wherein the instructions for adjusting the control signal to the rotor in order to reduce the striking force include instructions for:
   in response to detecting the rotor strike, opening a power switch in a switched converter, wherein the power switch is connected to a power supply at one end and the adaptive control signal at the other end such that opening the power switch electrically disconnects the adaptive control signal from the power supply; and
   in response to detecting the rotor strike, opening a ground switch in the switched converter, wherein the ground switch is connected to ground at one end and the adaptive control signal at the other end such that opening the power switch electrically disconnects the adaptive control signal from ground.

8. The system recited in claim 1, wherein the instructions for adjusting the control signal to the rotor in order to reduce the striking force include instructions for:
   in response to detecting the rotor strike, obtaining an altitude associated with the aircraft;
   comparing the altitude against an altitude threshold;
   in response to the altitude exceeding the altitude threshold, at least temporarily adjusting the control signal to the rotor in order to reduce the striking force associated with the rotor; and
   in response to the altitude not exceeding the altitude threshold, adjusting the control signal to the rotor in order to reduce the striking force associated with the rotor, at least until one or more of the following occurs: a reset or a part replacement.

9. The system recited in claim 1, wherein the instructions for adjusting the control signal to the rotor in order to reduce the striking force include instructions for:
   in response to detecting the rotor strike, obtaining an altitude associated with the aircraft;
   comparing the altitude against an altitude threshold;
   in response to the altitude exceeding the altitude threshold, at least temporarily adjusting the control signal to the rotor in order to reduce the striking force associated with the rotor, wherein the rotor is permitted to restart in response to a pilot restart instruction without a reset prior to the pilot restart instruction or a part replacement prior to the pilot restart instruction; and
   in response to the altitude not exceeding the altitude threshold, adjusting the control signal to the rotor in order to reduce the striking force associated with the rotor, at least until one or more of the following occurs: a reset or a part replacement.

10. The system recited in claim 1, wherein:
    the aircraft includes a parachute system; and
    the instructions for adjusting the control signal to the rotor in order to reduce the striking force include instructions for:
       in response to detecting the rotor strike, obtaining an altitude associated with the aircraft;
       comparing the altitude against a higher altitude threshold and a lower altitude threshold;
       in response to the altitude not exceeding the lower altitude threshold, adjusting the control signal to the rotor in order to reduce the striking force associated with the rotor; and
       in response to the altitude exceeding the higher altitude threshold, adjusting the control signal to the rotor in order to reduce the striking force associated with the rotor, wherein in response to the altitude exceeding the lower altitude threshold and not exceeding the higher altitude threshold, the striking force associated with the rotor is not reduced.

11. A method of rotor strike detection and striking force reduction, the method comprising: detecting, using a processor, a rotor strike including by comparing a commanded control signal against an adaptive control signal, wherein the rotor strike is caused by a rotor included in an aircraft striking an object and the adaptive control signal is associated with controlling the rotor and the adaptive control signal varies based at least in part on the commanded control signal and state information associated with the rotor; and in response to detecting the rotor strike, adjusting, using the processor, a control signal to the rotor to change rotation of the rotor to reduce a striking force applied to the object being struck by the rotor and prevent damage to at least one of the object being struck and the rotor during at least one of: take-off, landing, and flying at a steady altitude.

12. The method recited in claim 11, wherein comparing the commanded control signal against the adaptive control signal in order to detect the rotor strike includes:
determining a reference signal based at least in part on the commanded control signal;
determining a degree to which the adaptive control signal, which includes a sinusoidal signal, deviates from the reference signal;
comparing the degree against a detection threshold; and
in response to the degree exceeding the detection threshold, declaring that the rotor strike has been detected.

13. The method recited in claim 11, wherein comparing the commanded control signal against the adaptive control signal in order to detect the rotor strike includes:
determining a reference signal based at least in part on the commanded control signal, wherein the reference signal includes a measurement threshold;
determining a degree to which the adaptive control signal, which includes a sinusoidal signal, deviates from the reference signal;
comparing the degree against a detection threshold; and
in response to the degree exceeding the detection threshold, declaring that the rotor strike has been detected.

14. The method recited in claim 11, wherein comparing the commanded control signal against the adaptive control signal in order to detect the rotor strike includes:
determining a reference signal based at least in part on the commanded control signal, wherein the reference signal includes a sinusoidal reference signal;
determining a degree to which the adaptive control signal, which includes a sinusoidal signal, deviates from the reference signal;
comparing the degree against a detection threshold; and
in response to the degree exceeding the detection threshold, declaring that the rotor strike has been detected.

15. The method recited in claim 11, wherein adjusting the control signal to the rotor in order to reduce the striking force includes:
in response to detecting the rotor strike, using an electrical connector to electrically disconnect the adaptive control signal from a rotor input signal; and
in response to electrically disconnecting the adaptive control signal from the rotor input signal, using a pull resistor to set the rotor input signal to a known value associated with reducing the striking force associated with the rotor.

16. The method recited in claim 11, wherein adjusting the control signal to the rotor in order to reduce the striking force includes:
in response to detecting the rotor strike, opening a power switch in a switched converter, wherein the power switch is connected to a power supply at one end and the adaptive control signal at the other end such that opening the power switch electrically disconnects the adaptive control signal from the power supply; and
in response to detecting the rotor strike, closing a ground switch in the switched converter, wherein the ground switch is connected to ground at one end and the adaptive control signal at the other end such that closing the power switch electrically connects the adaptive control signal to ground.

17. The method recited in claim 11, wherein adjusting the control signal to the rotor in order to reduce the striking force includes:
in response to detecting the rotor strike, opening a power switch in a switched converter, wherein the power switch is connected to a power supply at one end and the adaptive control signal at the other end such that opening the power switch electrically disconnects the adaptive control signal from the power supply; and
in response to detecting the rotor strike, opening a ground switch in the switched converter, wherein the ground switch is connected to ground at one end and the adaptive control signal at the other end such that opening the power switch electrically disconnects the adaptive control signal from ground.

18. The method recited in claim 11, wherein adjusting the control signal to the rotor in order to reduce the striking force includes:
in response to detecting the rotor strike, obtaining an altitude associated with the aircraft;
comparing the altitude against an altitude threshold;
in response to the altitude exceeding the altitude threshold, at least temporarily adjusting the control signal to the rotor in order to reduce the striking force associated with the rotor; and
in response to the altitude not exceeding the altitude threshold, adjusting the control signal to the rotor in order to reduce the striking force associated with the rotor, at least until one or more of the following occurs: a reset or a part replacement.

19. The method recited in claim 11, wherein adjusting the control signal to the rotor in order to reduce the striking force includes:
in response to detecting the rotor strike, obtaining an altitude associated with the aircraft;
comparing the altitude against an altitude threshold;
in response to the altitude exceeding the altitude threshold, at least temporarily adjusting the control signal to the rotor in order to reduce the striking force associated with the rotor, wherein the rotor is permitted to restart in response to a pilot restart instruction without a reset prior to the pilot restart instruction or a part replacement prior to the pilot restart instruction; and
in response to the altitude not exceeding the altitude threshold, adjusting the control signal to the rotor in order to reduce the striking force associated with the rotor, at least until one or more of the following occurs: a reset or a part replacement.

20. The method recited in claim 11, wherein:
the aircraft includes a parachute system; and
adjusting the control signal to the rotor in order to reduce the striking force includes:
in response to detecting the rotor strike, obtaining an altitude associated with the aircraft;

comparing the altitude against a higher altitude threshold and a lower altitude threshold;
in response to the altitude not exceeding the lower altitude threshold, adjusting the control signal to the rotor in order to reduce the striking force associated with the rotor; and
in response to the altitude exceeding the higher altitude threshold, adjusting the control signal to the rotor in order to reduce the striking force associated with the rotor, wherein in response to the altitude exceeding the lower altitude threshold and not exceeding the higher altitude threshold, the striking force associated with the rotor is not reduced.

21. A computer program product, the computer program product being embodied in a non-transitory computer readable storage medium and comprising computer instructions for: detecting, using a processor, a rotor strike including by comparing a commanded control signal against an adaptive control signal, wherein the rotor strike is caused by a rotor included in an aircraft striking an object and the adaptive control signal is associated with controlling the rotor and the adaptive control signal varies based at least in part on the commanded control signal and state information associated with the rotor; and in response to detecting the rotor strike, adjusting, using the processor, a control signal to the rotor to change rotation of the rotor to reduce a striking force applied to the object being struck by the rotor and prevent damage to at least one of the object being struck and the rotor during at least one of: take-off, landing, and flying at a steady altitude.

* * * * *